US005564955A

United States Patent [19]

Ingraham

[11] Patent Number: 5,564,955

[45] Date of Patent: Oct. 15, 1996

[54] BRACKET FOR SUPPORTING AN ELECTRIC POWERED OUTBOARD MOTOR AND AN ELECTRIC BATTERY RELATIVE TO A MARINE VESSEL

[76] Inventor: Jerry Ingraham, 2250 Lion Mountain, Whitefish, Mont. 59937

[21] Appl. No.: 499,546

[22] Filed: Jul. 6, 1995

[51] Int. Cl.[6] ........ B60L 11/02

[52] U.S. Cl. ........ 440/6; 114/343; 114/61

[58] Field of Search ........ 440/6, 53, 55, 440/900; 114/61, 343, 345, 346, 364; 248/640-643; 441/129-131

[56] References Cited

U.S. PATENT DOCUMENTS

| | | | |
|---|---|---|---|
| 2,223,625 | 12/1940 | Krupp | 114/345 |
| 2,507,613 | 5/1950 | Reid | 248/641 |
| 3,665,534 | 5/1972 | McIntyre | 114/343 |
| 4,227,480 | 10/1980 | Carras | 248/642 |
| 4,303,033 | 12/1981 | King | 440/6 |
| 4,371,144 | 2/1983 | Godlewski | 114/343 |
| 4,637,332 | 1/1987 | Glime | 440/53 |
| 4,771,722 | 9/1988 | Tihany | 114/343 |

*Primary Examiner*—Edwin L. Swinehart
*Attorney, Agent, or Firm*—Diller, Ramik & Wight, PC

[57] ABSTRACT

A bracket is provided for supporting an electric powered outboard motor, such as a trolling motor, and a battery relative to a small marine vessel, such as a Hobie Cat, in order to provide propulsion during becalm conditions. The motor and battery bracket includes a chamber for housing a D.C. electric battery and a transom plate projecting therefrom in a generally vertical plane to which an electric powered outboard motor or trolling motor can be clamped. The latter bracket is preferably constructed for vertical adjustment. A quick connect/disconnect coupling secures the bracket to structural members of the marine vessel, specifically to the dolphin striker post and dolphin striker rod of a Hobie Cat catamaran.

22 Claims, 3 Drawing Sheets

BRACKET FOR SUPPORTING AN ELECTRIC POWERED OUTBOARD MOTOR AND AN ELECTRIC BATTERY RELATIVE TO A MARINE VESSEL

BACKGROUND OF THE INVENTION

The invention is directed to a bracket for supporting an electric powered outboard motor, such as a so-called electric trolling motor, relative to a small marine vessel, such as a Hobie Cat catamaran, in order to provide propulsion during becalm conditions.

A motor bracket under the name "CHEETA MOTOR BRACKET" is provided as an accessory for Hobie Cat sailboats and is intended to propel the same when the wind disappears. The motor bracket assembles to the rear cross bar of the trampoline frame of the Hobie Cat catamaran or sailboat, and includes a support arm pivoted at one end to the motor bracket and carrying at an opposite end a transom member to which an electric motor can be secured. The support arm is retained in a horizontal position when the electric motor is in use and can be pivoted to lift the motor completely out of the water when not in use. A major disadvantage of this conventional motor bracket is that in both the use and non-use positions the motor is located at a position susceptible to being bumped or struck by an occupant which can cause damage to the occupant, the motor bracket, the motor or all three. In addition, this conventional motor bracket is limited strictly to supporting the electric motor and no provision is made for housing an associated D.C. battery at an unobtrusive location. Accordingly, it is not uncommon to see the D.C. electric battery lashed in a rather unsecured fashion by bungee cords or the like to one of the corners of the trampoline frame. Obviously, this location is dangerous to occupants seated upon the trampoline, and it is not uncommon to have a battery simply drop overboard, particularly should the sailboat flip under the influence of high wind or virtually any other adverse sailing conditions.

SUMMARY OF THE INVENTION

In keeping with the foregoing, the present invention is directed to a bracket for supporting both an electric powered outboard motor and an associated D.C. electric battery relative to a marine vessel, most specifically a sailboat, such as a Hobie Cat sailboat. However, the invention is equally applicable to utilization in conjunction with a boat driven by a gas powered outboard engine or an inboard engine. However, in keeping with the specific intent of the invention, the bracket supports both the electric powered outboard motor and the D.C. electric battery in an out-of-the-way position in both use and non-use positions thereby assuring that occupants upon the trampoline will not be injured no matter the sailing conditions or the attitude of the sailing craft.

The bracket of the invention preferably utilizes a vertical rearwardly opening channel and a pair of downwardly opening channels to embracingly receive an associated dolphin striker post and a dolphin striker rod, respectively, of the trampoline frame of a Hobie Cat catamaran. A single removable pin firmly secures the bracket relative to the dolphin striker post and the dolphin striker rod thus enabling the rapid assembly and disassembly of the bracket relative to the trampoline frame. The bracket also includes a generally vertically disposed transom plate to which the electric motor can be clamped. The transom plate is also mounted for vertical adjustment in another vertical channel to selectively vertically adjust the height of the electric motor.

The bracket also includes as an integral part thereof a housing for receiving and supporting an associated D.C. electric battery. In this fashion the battery and the electric motor are supported immediately adjacent each other and both are located unobtrusively generally below the trampoline in both use and non-use position of the electric motor. Accordingly, occupants upon the trampoline cannot be injured under wind or windless conditions of vessel movement because the bracket, the electric motor and the battery are located unobtrusively removed from the trampoline area and occupants supported thereupon.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 2:
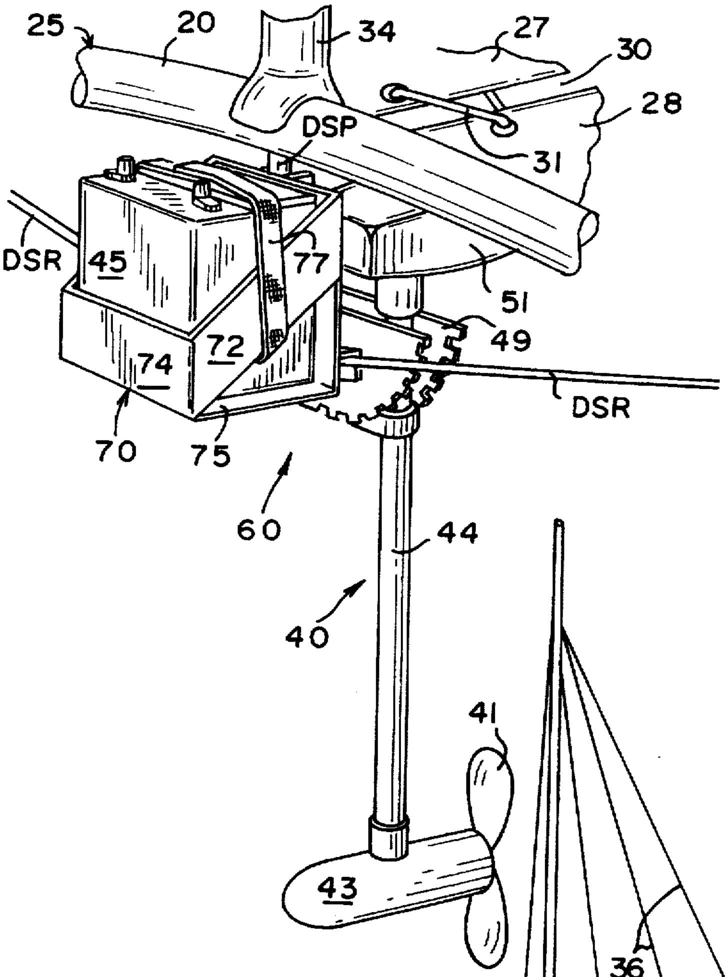
FIG. 2 is a fragmentary perspective view of the novel bracket of this invention viewed from the bow or front of the sailboat, and illustrates a D.C. electric battery and an electric trolling motor supported by the bracket with the electric trolling motor being in its in-use position.
Figure 1:
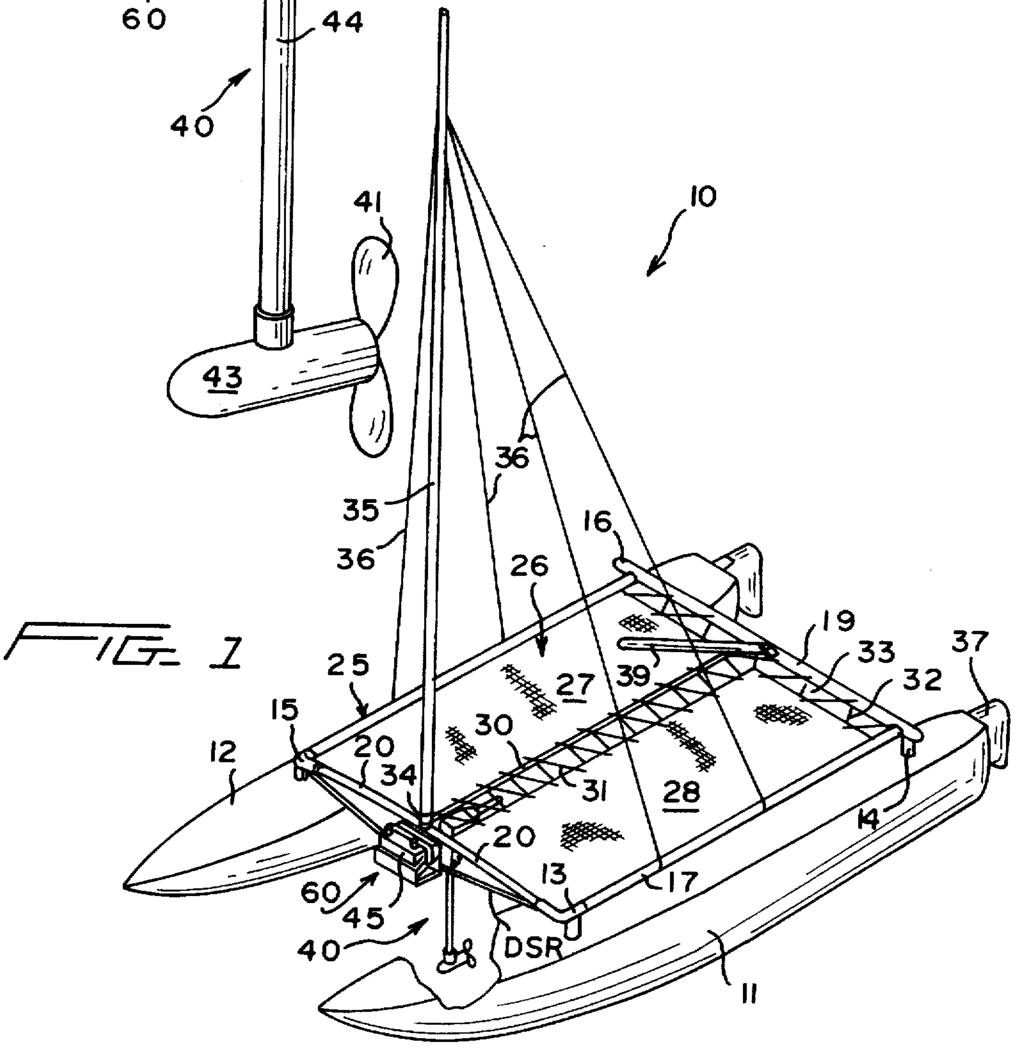
FIG. 1 is a fragmentary top perspective view of a marine vessel, specifically a Hobie Cat catamaran or sailboat, and illustrates the novel electric motor and battery bracket of the present invention supported adjacent a black front bow crossbar of the trampoline frame.

A conventional marine vessel is illustrated in FIG. 1 of the drawings and is generally designated by the reference numeral 10. The marine vessel 10 is a conventional sailboat, such as a Hobie Cat catamaran or sailboat, which includes port and starboard hulls 11, 12; front port and back port corner castings 13, 14, respectively; front starboard and rear starboard corner castings 15, 16, respectively; a port side bar 17, a starboard side bar 18, a rear or stern crossbar 19 and a black cross bar 20. The side bars 17, 18 are conventionally connected between the respective castings 13, 14 and 15, 16, while the crossbars 19, 20 are conventionally connected between the respective castings 14, 16 and 13, 15 thereby collectively defining a trampoline frame 25 within which is a trampoline 26 defined by two trampoline portions 27, 28. A center gap or slot 30 between the trampoline portions 27, 28 is spanned by conventional center lacing 31 and similar stern lacing 32 spans a stern gap or slot 33 between the trampoline portions 27, 28 and the rear cross bar 19. A mast step 34 has secured thereto an end of a mast 35 which is stabilized by a plurality of shrouds 36. A rudder 37, 38 is pivotally connected to the respective hulls 11, 12, and the rudders 37, 38 are simultaneously conventionally manipulated by movement imparted to a tiller 39. A sheet (not shown) associated with the mast 35 provides the requisite reaction surface for sailing under the influence of the wind, but should the vessel become becalmed, a conventional D.C. electric motor or trolling motor 40 (FIGS. 1 through 5) can be utilized to provide propulsion in association with an electric direct current (D.C.) battery 45 through appropriate electrical conductors and alligator clips (not shown).

The electric motor 40 includes a propeller 41 connected to a shaft 42 which enters a lower housing 43 housing an electric motor (not shown) with associate wiring running through a tubular shaft 44 which is telescopically slidingly received in a sleeve 46 of a first member 47 which is pivotally connected at 48 to a second or clamping member 49 carrying clamping screws 50. The first and second members 47, 49, respectively, can be conventionally selectively adjusted in any one of a number of different positions between the in-use position shown in FIGS. 1 through 4 and the stored or out-of-the-way position shown in FIG. 5 through an appropriate spring detent mechanism (not shown) and a plurality of notches (unnumbered). An upper end portion of the tubular end shaft 44 is connected to an upper housing 51 from which projects a rotatable and generally extensible control handle 52 which normally can be rotated between "off" and "on" positions and several variable speed positions therebetween.

A bracket for supporting the electric powered outboard motor or trolling motor 40 and also for supporting the electric battery 45 relative to the marine vessel or sailboat 10 is generally designated by the reference numeral 60.

The bracket 60 is best illustrated in FIGS. 2, 5, 6 and 7 of the drawings and includes means 70 for supporting the D.C. battery 45 in the form of a housing defined by a rear wall 71, side walls 72, 73, a front wall 74 and a substantially horizontally disposed bottom wall, support surface or cantilevered platform 75. A conventional hold-down strap, bungee or the like 77 is utilized to securely hold down the battery 45 within the housing 70 upon the bottom wall or platform 75 thereof, as is readily apparent from FIG. 2 of the drawings.

Figure 6:
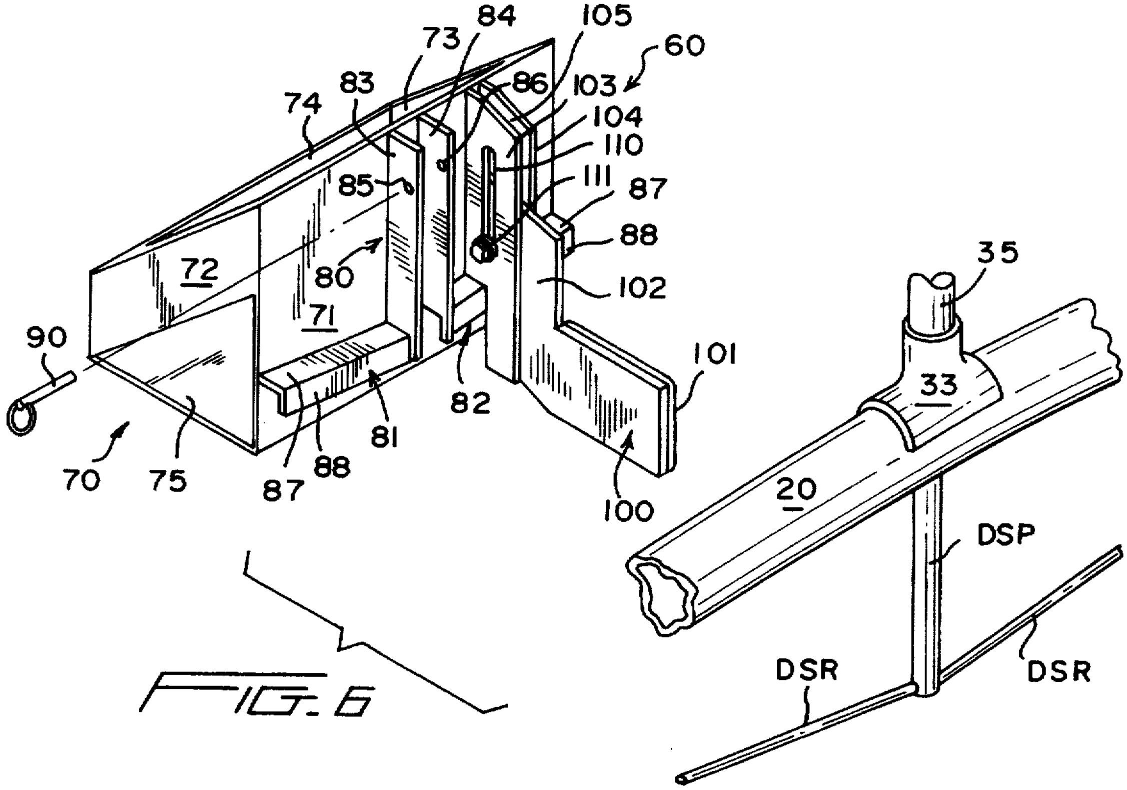
FIG. 6 is a fragmentary exploded perspective view of the bracket and a portion of the sailboat frame, and illustrates the bracket as including a platform for supporting the electric battery, channels for receiving the dolphin striker post and dolphin striker rod of the sailboat frame, and a vertically adjustable transom plate to which is clamped the electric motor.
Figure 7:
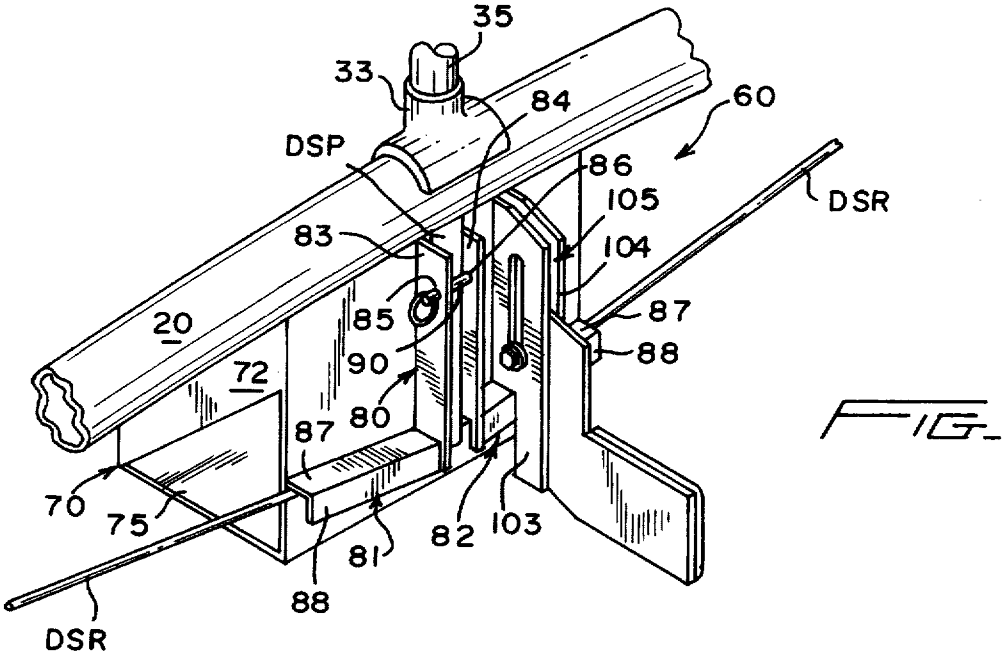
FIG. 7 is a fragmentary perspective view similar to FIG. 6, and illustrates the bracket with the channels thereof receiving therein the dolphin striker post and the dolphin striker rod and a removable pin for maintaining the latter components in their assembled relationship.

The rear wall 71 of the bracket 60 includes first means 80 and second means 81, 82 in the form of respective vertically disposed rearwardly opening and horizontally disposed downwardly opening slots or channels which embrace two specific structural members of the trampoline frame 25, namely, a dolphin striker post DSP being and a dolphin striker rod DSR which are best illustrated in FIGS. 6 and 7 of the drawings. The dolphin striker post DSP and the dolphin striker rod DSR are conventional structures located at the front or bow portion of the frame 25 with the dolphin striker post DSP being generally axially aligned with the mast step 33 and the mast 35 and spanning the gap (unnumbered) between the black front crossbar 20 and the dolphin striker rod DSR. The generally vertically disposed rearwardly opening channel 80 is formed by a portion of the back wall 71 of the housing 70 and two vertically disposed spaced generally parallel plates 83, 84 welded to the rear wall 81 and having aligned circular openings 85, 86, respectively, therein. The generally horizontally disposed downwardly opening channels 81, 82 are formed by respective angle irons, each including a generally horizontally disposed web 87 welded to the rear wall 71 and a vertically depending web 88. As is most readily apparent from FIG. 7, the bracket 60 is assembled upon the frame 25 by moving the vertical channel 80 into embracing relationship to the dolphin striker post DSP and dropping the bracket 60 downwardly which allows the horizontal channels 81, 82 to embrace the dolphin striker rod DSR on opposite sides of the dolphin striker post DSP, as is clearly evident in FIG. 7. Means are provided in the form of a generally cylindrical pin 90 which can be slid through the openings 85, 86 in the manner shown in FIG. 7 to secure the bracket 60 in its in-use position.

Figure 3:
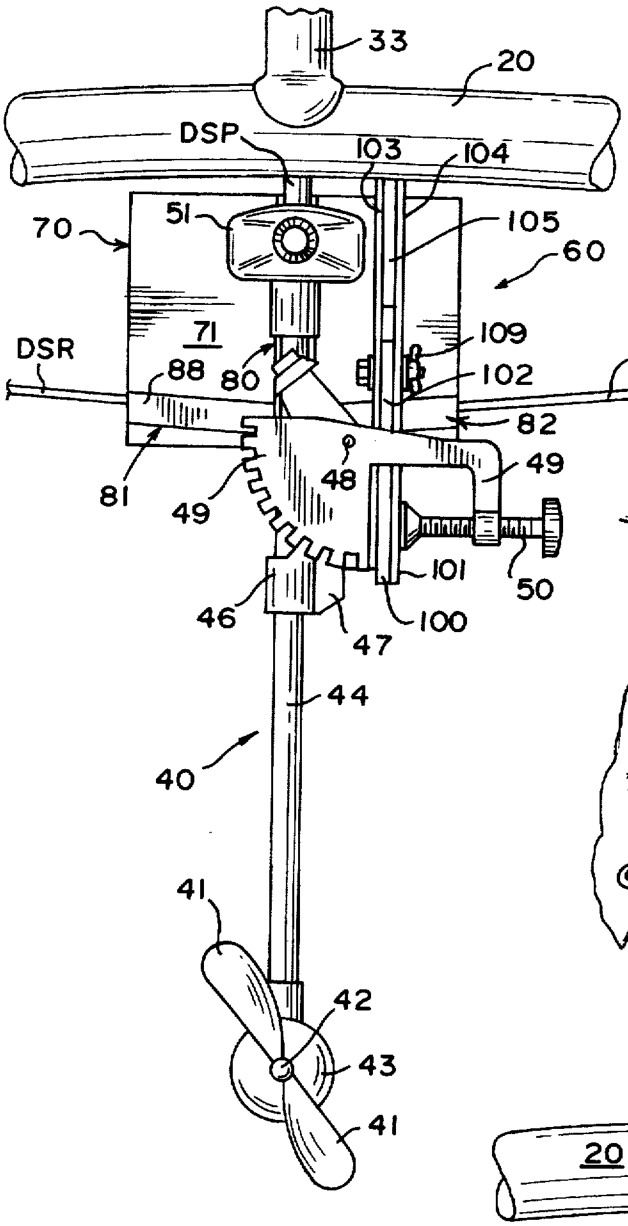
FIG. 3 is a fragmentary rear elevational view of the bracket, and illustrates the manner in which the electric motor is secured to a transom plate of the bracket with the shaft of the electric motor aligned with the longitudinal center line of the sailboat and the axis of its mast.
Figure 4:
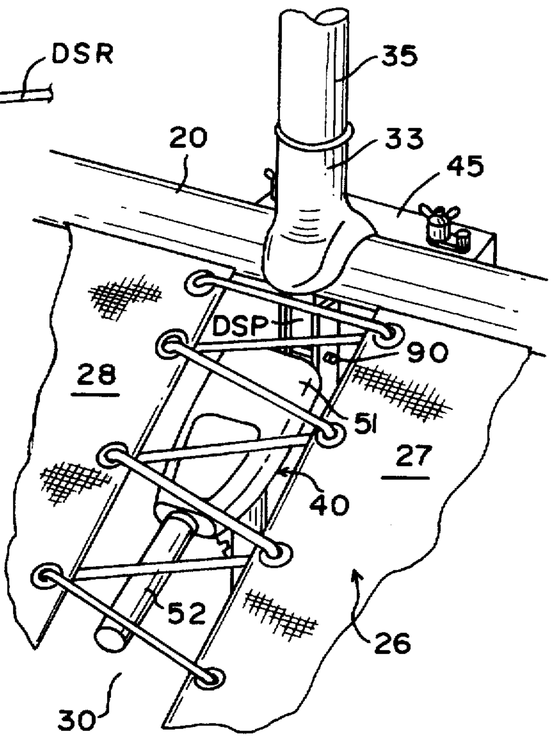
FIG. 4 is a fragmentary top perspective view, and illustrates the accessibility of the rotatable speed control handle of the electric motor through the center lacing of the trampoline adjacent the black front crossbar.
Figure 5:
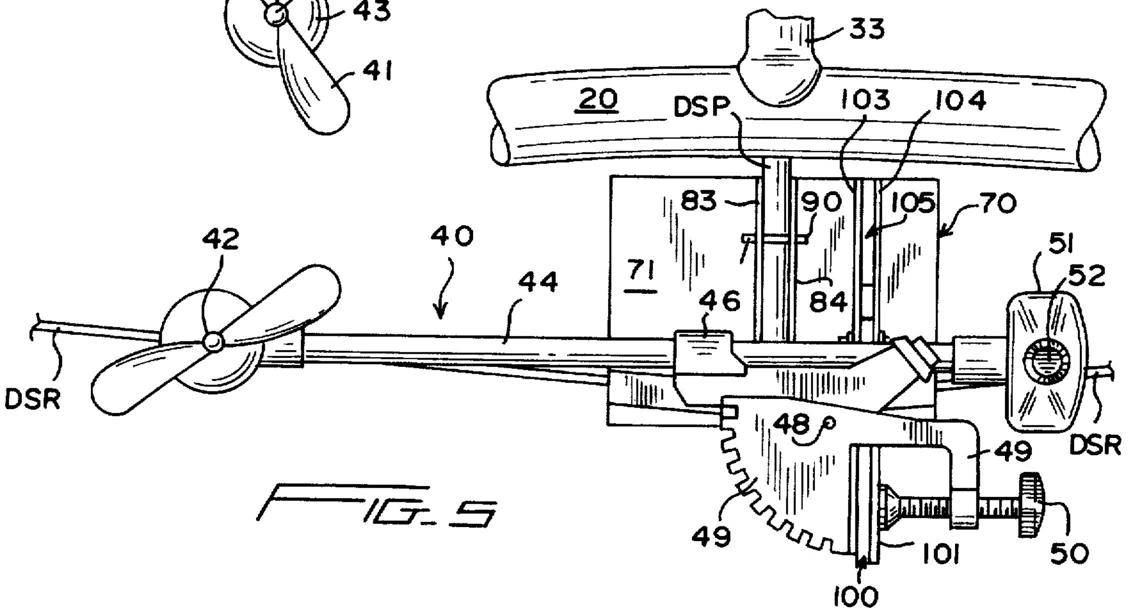
FIG. 5 is fragmentary rear elevational view similar to FIG. 3, and illustrates the electric motor in its out-of-the-way or non-use position.

The bracket 60 also includes means 100 in the form of a substantially vertically disposed supporting transom surface or plate which is cantilevered in a rearward direction for supportingly clampingly receiving the second member or clamping member 49 of the electric motor 40, as is readily apparent from FIGS. 3 and 5 of the drawings. Preferably, a wood or hard rubber plate 101 is carried by the transom plate 100 to provide an excellent gripping surface for assuring non-slippage/non-rotation of the screws 50 after the latter have been tightened.

The electric motor support means 100 further includes a forwardly projecting portion 102 having an opening (not shown). The forwardly projecting portion 102 is sandwiched between two vertical plates 103, 104 defining a vertical rearwardly opening channel 105 having a depth corresponding to the thickness of the forward plate portion 102. A forwardmost vertical edge (unnumbered) of the forward plate portion 102 rests against the rear wall 71 of the housing 70 and prevents the entirety of the outboard motor supporting means 100 from pivoting or cocking and assures only uni-directional vertical sliding motion under the guidance of a pair of aligned slots 110 formed in the plates 103, 104 in generally parallel relationship to each other. A threaded bolt 111 passes through the slots 110 and an opening in the forward plate portion 102. A wing nut 109 (FIG. 3) can be utilized to tighten the bolt 111 in any one of a plurality of selected positions along the length of the slots 110 to locate the transom plate 101 at a desired vertical position to accommodate electric motors of different designs, sizes and physical characteristics. In lieu of the pair of slots 110, a number of horizontally aligned vertically spaced openings can be provided in the plates 103, 104 to achieve step-adjustment of the transom plate 101.

OPERATION

Once the bracket 60 has been assembled to the frame 25, and more specifically to the dolphin striker post DSP and the dolphin striker rod DSR in the manner shown in FIG. 7, the D.C. electric motor 40 is simply clamped to the transom plate 101 in the manner clearly apparent from FIGS. 3 and 5 of the drawings. It should be particularly noted from FIGS. 3 and 5 of the drawings that the bracket 60, the battery 45 and the motor 40 each occupy a position beneath the frame 25 and beneath the trampoline 26 both when the motor 44 is in use (FIG. 3) and when the motor 40 is in its non-use or stored position (FIG. 5). Thus, a person (or persons) supported atop the trampoline 26 will never come into contact with the bracket 10, the motor 40 or the battery 45 whether under full sail (FIG. 5) or under electric power (FIG. 3), and irrespective of the inclination, orientation or attitude of the sailboat 10. Therefore, injury to occupants upon the trampoline is virtually totally eliminated because of the location of the bracket 60, the battery 45 and the motor 40 at all times beneath the frame 25 and the trampoline 26 thereof. Furthermore, when in use (FIG. 3), the shaft 44 is clamped in the position shown in FIG. 3 by a set screw (not shown) passing through the tubular portion 46 of the first member 47 which locks the motor 40 in the position shown in FIGS. 3 and 4. This is particularly important because the speed control handle 52 (FIG. 4) can be accessed through the center gap 30 and rotated by the occupant to initiate straight-forward or straight rearward propulsion at a desired speed. Once the latter is accomplished, the occupant merely moves to the stern of the sailboat 10 and manipulates the tiller 39 to turn the sailboat 10 through the manipulation of the rudders 37, 38. Thus, the occupant manning the tiller 39 is positioned remote from the bracket 60 under both electric power or wind power, both thereby assuring through the remoteness of the occupant from the bracket 60 that damage or injury will not occur.

Although a preferred embodiment of the invention has been specifically illustrated and described herein, it is to be understood that minor variations may be made in the apparatus without departing from the spirit and scope of the invention, as defined the appended claims.

I claim:

1. A bracket for supporting an electric powered outboard motor and an electric battery relative to a marine vessel comprising means for supporting an electric battery, means for supporting an electric powered outboard motor, means for removably securing said bracket to a marine vessel, and said bracket securing means includes first and second independent means for embracing respective first and second substantially vertically and horizontally disposed individual components of an associated marine vessel.

2. The bracket as defined in claim 1 wherein said electric battery supporting means includes a substantially horizontally disposed supporting surface.

3. The bracket as defined in claim 1 wherein said electric battery supporting means includes a substantially horizontally disposed supporting surface in the form of a platform.

4. The bracket as defined in claim 1 wherein said electric battery supporting means includes a substantially horizontally disposed supporting surface in the form of a substantially cantilevered platform.

5. The bracket as defined in claim 1 wherein said outboard motor supporting means includes a substantially vertical disposed supporting surface.

6. The bracket as defined in claim 1 wherein said outboard motor supporting means includes a substantially vertical disposed supporting surface in the form of a plate.

7. The bracket as defined in claim 1 wherein said outboard motor supporting means includes a substantially vertical disposed supporting surface, and means for vertically adjusting said vertically disposed supporting surface.

8. The bracket as defined in claim 1 wherein said first and second independent embracing means are disposed substantially normal to each other.

9. The bracket as defined in claim 1 wherein said outboard motor supporting means includes a substantially vertically disposed plate, and said first independent embracing means includes a channel opening in a direction generally toward said vertically disposed plate.

10. The bracket as defined in claim 1 wherein said outboard motor supporting means includes a substantially vertically disposed plate, said first independent embracing means includes a channel opening in a direction generally toward said vertically disposed plate, said channel includes a generally vertically disposed axis, and a plane through said axis is substantially parallel to a plane of said plate.

11. The bracket as defined in claim 1 wherein said first and second independent embracing means are located between said electric battery supporting means and said outboard motor supporting means.

12. The bracket as defined in claim 1 wherein said first and second independent embracing means are located between said electric battery supporting means and said outboard motor supporting means, and means for vertically adjusting said plate.

13. The bracket as defined in claim 7 wherein said first and second independent embracing means are disposed substantially normal to each other.

14. The bracket as defined in claim 9 wherein said first and second independent embracing means are disposed substantially normal to each other.

15. The bracket as defined in claim 10 wherein said first and second independent embracing means are disposed substantially normal to each other.

16. A bracket for supporting an electric powered outboard motor and an electric battery relative to a marine vessel comprising means for supporting an electric battery, means for supporting an electric powered outboard motor, means for removably securing said bracket to a marine vessel, and said bracket securing means includes first and second channel means for embracing respective first and second substantially vertically and horizontally disposed components of an associated marine vehicle.

17. The bracket as defined in claim 16 wherein said electric battery supporting means includes a substantially horizontally disposed supporting surface.

18. The bracket as defined in claim 16 wherein said electric battery supporting means includes a substantially horizontally disposed supporting surface in the form of a platform.

19. The bracket as defined in claim 16 wherein said electric battery supporting means includes a substantially horizontally disposed supporting surface in the form of a substantially cantilevered platform.

20. The bracket as defined in claim 16 wherein said outboard motor supporting means includes a substantially vertical disposed supporting surface.

21. The bracket as defined in claim 16 wherein said outboard motor supporting means includes a substantially vertical disposed supporting surface in the form of a plate.

22. The bracket as defined in claim 16 wherein said outboard motor supporting means includes a substantially vertical disposed supporting surface, and means for vertically adjusting said vertically disposed supporting surface.

* * * * *